June 11, 1968     T. STUTZ     3,388,262

ELECTRO-OPTICAL DISPLACEMENT MEASURING ARRANGEMENT

Filed Dec. 9, 1964     8 Sheets-Sheet 1

Inventor
Theo Stutz by Michael J. Striker ATTY.

$I_1 + I_2 + I_3 = 0$ $U_{b1} + U_{b2} + U_{b3} = 0$ $U_{b1} + U_{b2} + U_{b3} =$ constant

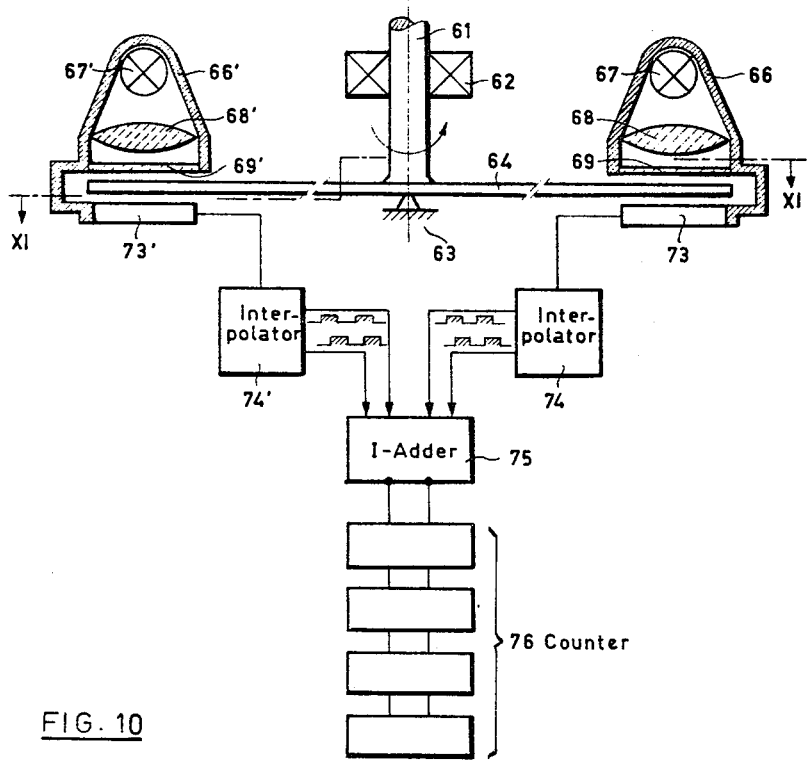
FIG. 10
FIG. 11
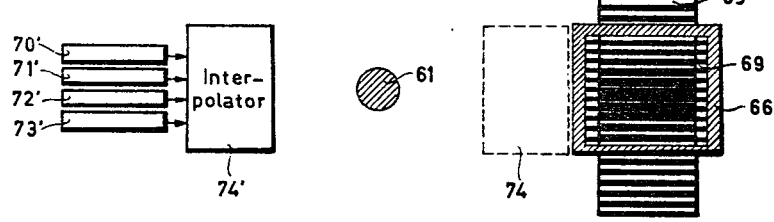

3,388,262
ELECTRO-OPTICAL DISPLACEMENT MEASURING
ARRANGEMENT
Theo Stutz, Zollikerberg, Zurich, Switzerland, assignor to
Contraves A.G., Zurich, Switzerland
Filed Dec. 9, 1964, Ser. No. 417,012
Claims priority, application Switzerland, Mar. 16, 1964,
3,381/64; Sept. 22, 1964, 12,285/64
17 Claims. (Cl. 250—237)

ABSTRACT OF THE DISCLOSURE

Three or four signals, mutually displaced by equal fractions of a cycle, each cycle representing a unit measurement of a measured quantity, are fed to a differentiating arrangement (several embodiments shown), for eliminating the D.C. component. Purely A.C. differentiating output voltages are fed in combination to a plurality $p$ of Scott circuits, each followed by a polarity discriminator. In combination, the $p$ binary outputs of the discriminators yield $2p$ different combinations, each characterizing a predetermined fraction of a unit measurement of the measured quantity.

---

The present invention relates to an electro-optical displacement measuring arrangement. More particularly, the invention relates to an electro-optical measuring arrangement for determining the magnitude and direction of the relative displacement or motion of two members which are either displaceable in relation to each other along a substantially straight line or are revolvably displaceable around a mutual axis.

One of the members of the displacement measuring arrangement has an optical line standard, grating, gradient, indicating or graduated scale which extends over the displacement area and the other member has a predetermined masking, grid or readout configuration. An illuminating device provides light which impinges upon the readout member, which is positioned on the indicating member. A plurality of photocells receive light reflected from or transmitted through the readout and indicating members and produce electrical signals which vary in accordance with the instantaneous degrees of brightness of such reflected light. The electrical signals produced by the photocells vary cyclically during the relative displacement of the indicating and readout members and vary in phase in accordance with the direction of the relative displacement.

As distinguished from known measuring arrangements of this type, the displacement measuring arrangement of the present invention utilizes three photocells which indicate the brightness of three translucent slots, zones or areas of the readout member. The positions of the slots of the readout member relative to the scale indications of the indicating member vary each by a third of a unit scale separation of said indicating member.

In the displacement measuring arrangement of the present invention, the electrical signals produced by the three photocells are fed to a differentiating arrangement. The differentiating arrangement suppresses the common components of the electrical signals from the photocells and provides the differential components of said electrical signals at the outputs of said differentiating arrangement at the same time.

It is preferable to produce a great number of linear combinations from any two of the three output signals of the differentiating arrangement. During the displacement of the readout and indicating members relative to each other, such combinations change periodically or cyclically in units of the scale of the indicating member and are displaced in phase toward each other by correspondingly smaller fractions of a cycle or period, or of a unit scale separation or interval. Multiplace systems of binary signals may be derived from this condition with the assistance of multivibrators or triggers such as, for example, known Schmitt triggers. In the multiplace system of binary signals, each of the possible condition combinations clearly defines a specific fraction of a line standard unit of the indicating member, so that the resolving power of the measuring arrangement of the invention becomes correspondingly enhanced and more precise. The variations of the condition combinations of the binary signals may be counted, recorded or indicated according to the positive or negative direction, that is, forward or backward, in accordance with the signal sequence. The counting, recording or indicating may be accomplished by a suitable circuit or computer arrangement which indicates, at any time, the sum of the counted fractions and thus indicates the then position of the readout and indicating members relative to an initial position.

The determination of the magnitude and direction of the relative displacement or motion of two members which are revolvably displaceable about a mutual axis may be utilized to measure the angular displacement of one of the members relative to the other and may be used, for example, to control a machine tool or the like, or angle measuring apparatus or the like. Known angle measuring arrangements utilize an angle indicating member or disc having a line standard, grating, gradient, indicating or graduated scale on its periphery or in the area of its periphery. An electro-optical readout arrangement is coordinated with the indicating disc and produces electrical signals which are positive and negative for every unit variation of the angular position of the angle indicating disc. A forward and backward counter stage counts the electrical signals and accounts for their positive or negative polarity. In order to compensate for errors due to eccentricity of the angle indicating disc, the readout of angular variations at two diametrically opposed positions of the disc is combined.

A description of an angle measuring arrangement of the aforementioned type may be found in "Fotoelektrische Winkel und Weg Schriftgeber" or Photoelectric Angle and Motion Indicator, by F. Hoch, special publication No. 92–82–78/IX/61/LW of Leitz, G.m.b.H., Wetzlar, Germany. The combined readout of angular variations of two diametrically opposed areas of the disc is effected in a manner whereby on one side of the disc the graduated scale is illuminated and the illuminated zone of the graduated scale is projected to a diametrically opposed zone of the graduated scale with the assistance of a focussing lens. The photoelectric transduction is accomplished on the other side of the zone.

Two series of substantially square waves or pulses displaced 90 degrees out of phase with each other are produced as positive or negative movement, displacement or angular shift signals of the relative movement, displacement or angular shift of the indicating and readout members. A counter which counts forward and backward registers the positive and negative displacement signals so that the total stored in the counter corresponds to the corresponding rotary position of the angle indicating disc relative to a determined initial position. The critical problem of known angle measuring arrangements of this type is in the development of the optical image system, which is required to provide a sharp image of the illuminated graduation scale zone at a determined scale, in predetermined orientation to a predetermined different scale in order to attain the greatest precision under all possible operating conditions.

The angle measuring arrangement of the present invention does not require such an optical system. The angle measuring arrangement of the present invention utilizies identical readout units at both readout areas. Linearly moved graduated scales assist in producing positive and negative electrical signals which indicate the angular displacement. The angular displacement indicating electrical signals of both readout units are added together before being counted.

Apparatus for carrying out the angle measuring arrangement of the present invention is disclosed in the inventor's copending Swiss patent application No. 14,-895/63, filed Dec. 4, 1963, which discloses a readout system for producing a two place series of pulses which vary in fractions of the unit scale separations or intervals. Copending patent application Ser. No. 392,998 filed Aug. 24, 1964, discloses a counter which responds to positive and negative directions of the displacement signal and which provides very rapid and very reliable counting of the two place displacement signals and also discloses an arrangement for adding the displacement signals together is also disclosed in the inventor's copending Swiss patent application No. 10,417/63, filed Aug. 23, 1963.

In order that the present invention may be readily carried into effect, it will now be described with reference to the accompanying drawings, wherein:

FIG. 10 is a schematic view, partly in section, of an embodiment of the angle measuring arrangement of the present invention; and FIG. 11 is a view, partly in section, taken along lines XI–XI of FIG. 10.

In the figures, the same components are indicated by the same reference numerals.

Figure 1:
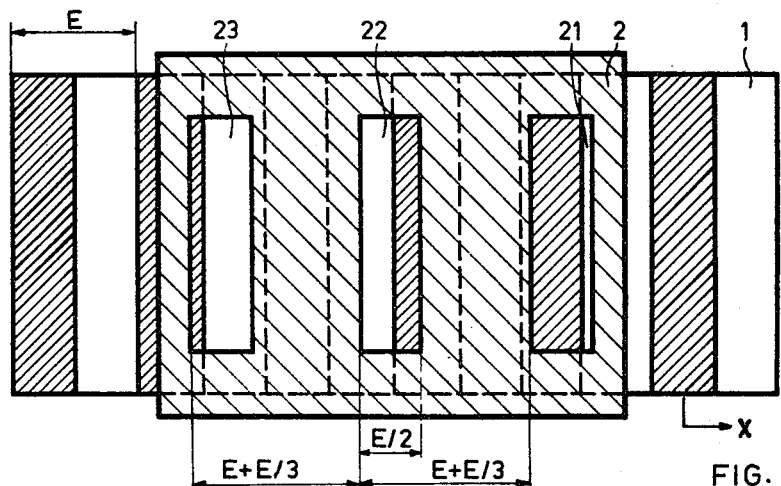
FIG. 1 is a plan view, on a greatly enlarged scale, of readout and indicating members of the type utilized in the displacement measuring arrangement of the present invention.

In FIG. 1, an indicating member 1 having an optical line standard, a grating, gradient, indicating or graduated scale and a readout member 2 having a masking, grid or readout configuration are displaceable or movable relative to each other. Either of the members 1 and 2 is movable or displaceable relative to the other. Thus, for example, either the indicating member 1 or the readout member 2 may be moved in the direction of the arrow or in the opposite direction.

The optical line standard or graduated scale of the indicating member 1 comprises a plurality of spaced parallel lines which indicate lines or areas which reflect or transmit practically no light, and a plurality of lines intermediate and separating said parallel lines which indicate lines or areas which reflect or transmit practically all light impinging upon the member 1. The non-reflecting or non-transmitting lines or areas are greatly exaggerated in size and are indicated by hatching and the reflecting or transmitting lines or areas are similarly greatly exaggerated in size and are clear. The non-reflecting or non-transmitting areas are of the same width. Each of these areas has a member 1. The line standard or scale of the indicating member 1 may be made with great precision of up to ten or a hundred unit scale separations or intervals E per millimeter of length of the scale.

The readout member 2 comprises non-transparent, non-translucent or opaque material having three spaced parallel transparent or translucent slots or areas 21, 22 and 23 formed therein. Each of the translucent slots 21, 22 and 23 has a width which is half the unit scale separation or interval E of the indicating member, or $E/2$. The width of the spaces between the same edges of adjacent translucent slots 21 and 22 and 22 and 23 is $E+E/3$ or one and one-third times the unit scale separation E of the indicating member 1. The translucent slots 21, 22 and 23 of the readout member 2 thus differ in position by $E/3$ relative to the non-reflecting or non-transmitting lines of the indicating member 1.

Thus, in the relative positions of the readout member 2 and the indicating member 1 shown in FIG. 1, the center slot 22 is half dark and half light, that is, half opaque and half translucent. The right slot 21 is ⅚ dark and ⅙ light, that is, ⅚ opaque and ⅙ translucent. The left slot 23 is ⅙ dark and ⅚ light, that is, ⅙ opaque and ⅚ translucent. These conditions are due, of course, to the position of the indicating member 1 relative to the readout member 2, since by themselves, the slots 21, 22 and 23 of the readout member 2 are light transmitting windows.

If the indicating member 1 is moved or displaced in the direction of the arrow X the translucent area covered by the slot 21 of the readout member 2 will decrease to a minimum of zero and then increase again as the indicating member continues to move in the direction of the arrow X. The translucent area covered by the slot 22 of the readout member 2 will increase to a maximum of 100 percent and then decrease again as the indicating member 1 continues to move in the direction of the arrow X. The translucent area covered by the slot 23 of the readout member 2 will decrease to a minimum of zero and then increase again as the indicating member 1 continues to move in the direction of the arrow X. If the indicating member 1 is displaced or moved in the direction opposite to that of the arrow X the translucent areas covered by the slots 21, 22 and 23 of the readout member 2 will increase to a maximum, decrease to a minimum and increase to a maximum, respectively, and then decrease, increase and decrease, respectively.

Figure 2:
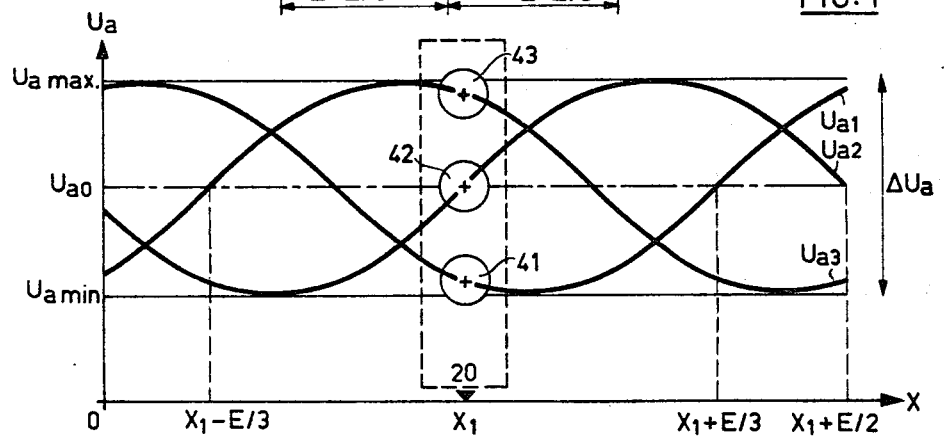
FIG. 2 is a graphical presentation of the signals produced by the photocells of the displacement measuring arrangement of the present invention.

In FIG. 2, a photocell support member 20 is indicated by broken lines. Three photocells 41, 42 and 43 are symbolically indicated as mounted on the photocell support member 20 in a two coordinated field having X as the abscissa and Ua as the ordinate. The momentary abscissa portion of the photocell support member 20 is indicated as X1 and the brightness values of the light received by or impinged upon the photocells 41, 42 and 43 via the translucent slots 21, 22 and 23 of the readout member 2 (FIG. 1) are indicated as crosses in said photocells and as periodic or alternating voltage curves $Ua1$, $Ua2$ and $Ua3$ of sinusoidal configuration. The voltage curves $Ua1$, $Ua2$ and $Ua3$ indicate the voltages produced by the photocells and may be of other than sinusoidal configuration such as, for example, triangular or sawtooth, or trapezoidal.

The voltage curves $Ua1$, $Ua2$ and $Ua3$ indicate how the brightness of light reflected or transmitted through the translucent slots 21, 22 and 23 of the readout member 2 of FIG. 1 fluctuates as the indicating member 1 is moved in the positive or negative direction of X. In FIG. 2, the photocell support member 20 is assumed to move in the appropriate direction $\pm X$ in which the readout member 2 moves, so that the ordinate values of the photocells 41, 42 and 43 follow the curves $Ua1$, $Ua2$ and $Ua3$.

As shown in FIG. 2, the voltages $Ua1$, $Ua2$ and $Ua3$ produced by the photocells 41, 42 and 43 are cyclically variable in unit values E of the line standard of the indicating member 1 (FIG. 1). However, this is the case only if the translucent slots 21, 22 and 23 of the readout member 2 of FIG. 1 are adjusted by values $E/3$ relative to the line standard of the indicating member 1 and if the photocells are properly adjusted in relation to said translucent slots. The curves $Ua1$, $Ua2$ and $Ua3$ of FIG. 2 each have the same average value $Ua0$ and the same amplitude $\Delta Ua$. This assures that the photocells have the same characteristics and are adjusted to equal sensitivity.

During actual operation, the average value $UaO$ will not remain constant but will fluctuate, depending upon the brightness of the illuminating device utilized to provide the light, or the local reflection and scattering conditions at the time. The fluctuations of the average value $Ua0$ apply to all the photocell voltages $Ua1$, $Ua2$ and $Ua3$. The differential fluctuations of the photocell voltages having an amplitude $\Delta Ua$ and phase displaced in relation to each other by period fractions of $\pm E/3$, are similar to a three phase alternating voltage of a power supply system. In the measuring arrangement of the present invention, however, the frequency of the voltages or signals $Ua1$, $Ua2$ and $Ua3$ are not constant, but correspond to the relative displacement velocity $$\frac{nE}{\frac{\Delta t}{2}} = \frac{\Delta x}{\Delta t}$$

of the indicating member 1 and the readout member 2. The relative displacement velocity is measured in unit scale separations or intervals E per unit time $\Delta t$ and is zero if there is no relative displacement of the indicating and readout members. The frequency is the number of cycles or periods per unit time.

If, instead of the coarse scale of the indicating member 1 of FIG. 1, a finer scale or line standard is utilized such as, for example, with unit scale separations or intervals E of $1/10$ or $1/100$ millimeter, it would be necessary to utilize a readout member having three assemblies or three translucent slots each rather than the three translucent slots 21, 22 and 23 of the readout member 2. Each of the three translucent slot assemblies would comprise a section of the grating, gradient, graduated, indicating or optical line standard scale identical with that of the indicating member 1 in graduation and orientation. Such translucent slot assemblies would be differently positioned or adjusted by values of $\pm E/3$ with relation to each other and to the line standard of the indicating member 1 than are the three translucent slots 21, 22 and 23 of FIG. 1. The brightness of light reflected or transmitted by the grating of the indicating member 1 exposed by the three slot assemblies may be determined by measurement of the brightness of the light reflected or transmitted through the corresponding slot assemblies. The positions of the slot assemblies each vary by a third of the unit scale separation or interval with relation to the line standard of the indicating member 1.

Figure 3:
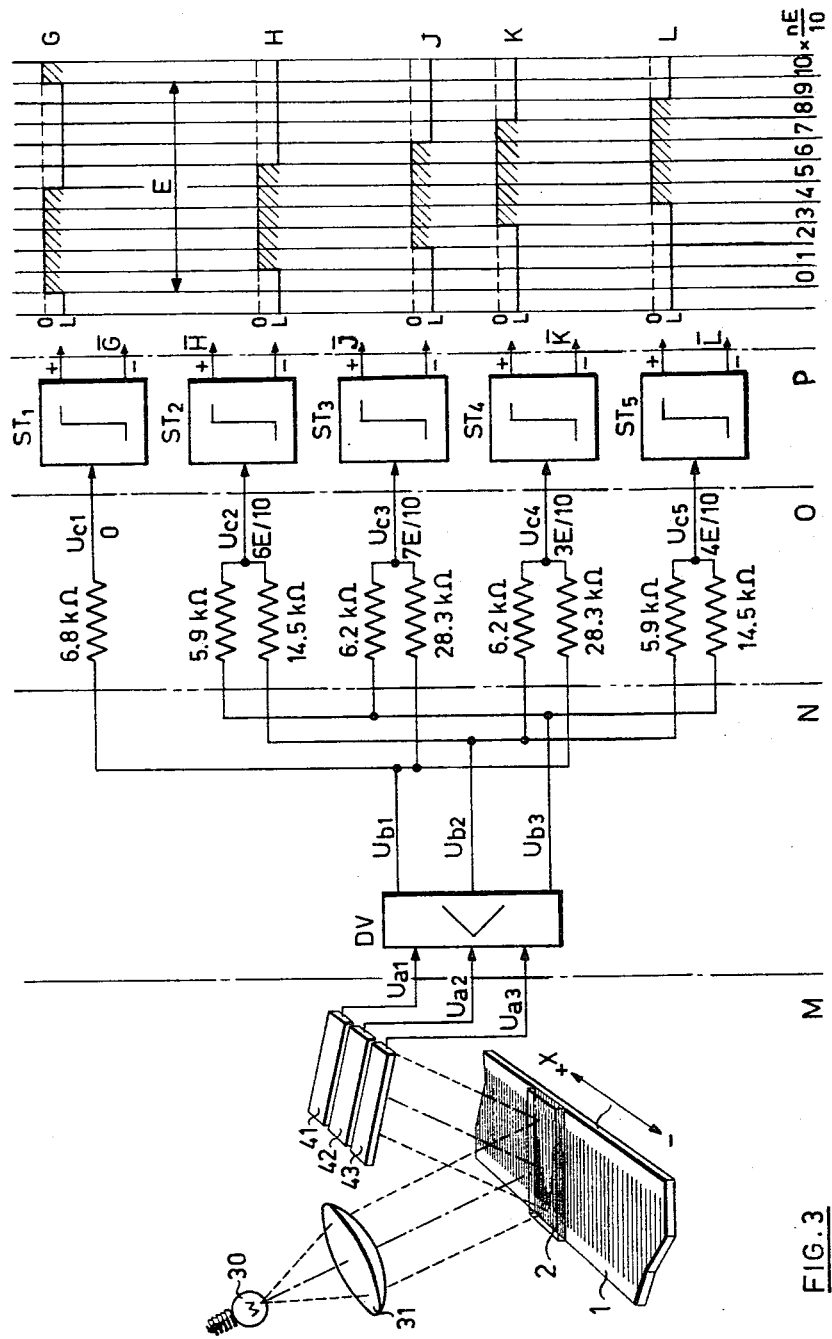
FIG. 3 is a schematic diagram of an embodiment of the displacement measuring arrangement of the present invention.

FIG. 3 illustrates an embodiment of a displacement measuring arrangement of the present invention. The circuit arrangement of FIG. 3 enables the production of the three photocell signals $Ua1$, $Ua2$ and $Ua3$ with suitable characteristics. The indicating member 1 may, for example, be affixed to a longitudinally displaceable, movable or slidable member or carriage of a machine tool or to the periphery of a rotary disc, the angular displacement or motion of which is to be measured. A readout member 2 is affixed to a member which is stationary. A light source 30 and a converging lens 31 function as an illuminating device. Three photocells 41, 42 and 43 are positioned in operative proximity with the readout member 2 to receive light reflected by the indicating member 1 through the translucent slots of said readout member.

The readout member 2 includes a section of an optical line grating which is developed and oriented the same as the line standard of the indicating member 1, but which at a greater number $q$ of line standard scale lines, similar to the Nonius apparatus, comprises $q\pm 1$ lines. When the two line gratings of the readout and indicating members are superimposed, a grating diagram is produced in which the local brightness values of light across the length of the readout member 2 cover the range from a maximum to a minimum, including all the intermediate values, in continuous transition.

The three photocells 41, 42 and 43 are so positioned adjacent each other above the readout member 2 and extending in the longitudinal direction of said readout member that each of said photocells indicates the brightness of a strip of reflected light which compared to the corresponding strips of reflected light indicated by the next adjacent photocells, is oriented at a difference of $\pm 1/3$ of a unit scale separation or interval $\pm E/3$ of the grating of the line standard of the indicating member 1. The electrical signals $Ua1$, $Ua2$ and $Ua3$ produced by the photocells 41, 42 and 43 are the same as those shown in FIG. 2.

The signals $Ua1$, $Ua2$ and $Ua3$ produced in stage M of the circuit arrangement of FIG. 3 are fed to three inputs of a differentiating arrangement DV of stage N of said circuit arrangement. The signals $Ua1$, $Ua2$ and $Ua3$ may be produced by any suitable arrangement which produces the curves of FIG. 2. The differentiating arrangement DV functions to suppress the common components of the photocell signals $Ua1$, $Ua2$ and $Ua3$, and to provide the differential components of said signals at three outputs of said differentiating arrangement at the same time.

The common components primarily comprise the average value $$Ua0 = \frac{Ua1 + Ua2 + Ua3}{3}$$

of the signals $Ua1$, $Ua2$ and $Ua3$. The output signals $Ub1$, $Ub2$ and $Ub3$ (sinusoidal signals) of the differentiating arrangement DV should satisfy the following equations at all times.

$$Ub1 = v\left[Ua1 - \left(\frac{Ua2}{2}\right)\left(\frac{Ua3}{2}\right)\right]$$

$$Ub2 = v\left[Ua2 - \left(\frac{Ua3}{2}\right)\left(\frac{Ua1}{2}\right)\right]$$

$$Ub3 = v\left[Ua3 - \left(\frac{Ua1}{2}\right)\left(\frac{Ua2}{2}\right)\right]$$

where $v$ is a common transistion factor. These equations are best satisfied by utilization of DC circuits such as, for example, the circuits of FIGS. 5, 6, 7 or 8.

Figure 5:
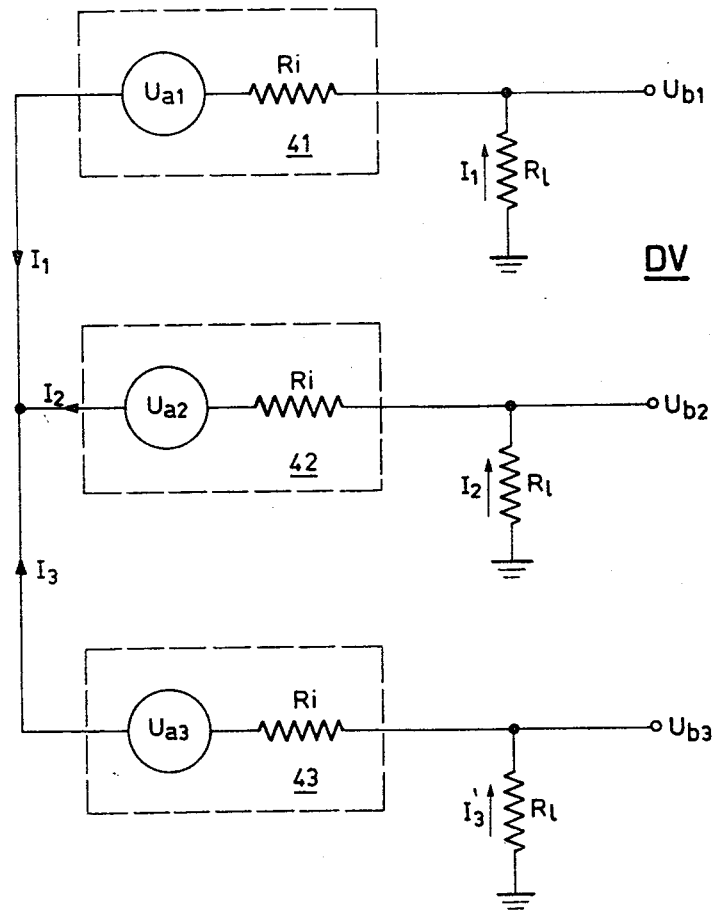
FIG. 5 is a circuit diagram of a first embodiment of a differentiating arrangement DV which may be utilized in the embodiment of FIG. 3.

FIG. 5 is a circuit diagram of a first embodiment of a differentiating arrangement which may be utilized in the embodiment of FIG. 3. In the embodiment of FIG. 5, the three photocells 41, 42 and 43 are indicated as voltage sources $Ua1$, $Ua2$ and $Ua3$, respectively, each with a series connected internal resistance $Ri$. The three photocells are connected together to a common junction point, so that $I1+I2+I3=0$ at all times.

The voltages at the load resistors RL are $Ub1 = I1RL$
$Ub2 = I2RL$
$Ub3 = I3RL$
$Ub1 + Ub2 + Ub3 = (I1+I2+I3) \ RL = (0) \ (RL) = 0$ so that the sum of the output voltages of the differentiating arrangement of FIG. 5 is zero and the requirements are satisfied.

Figure 6:
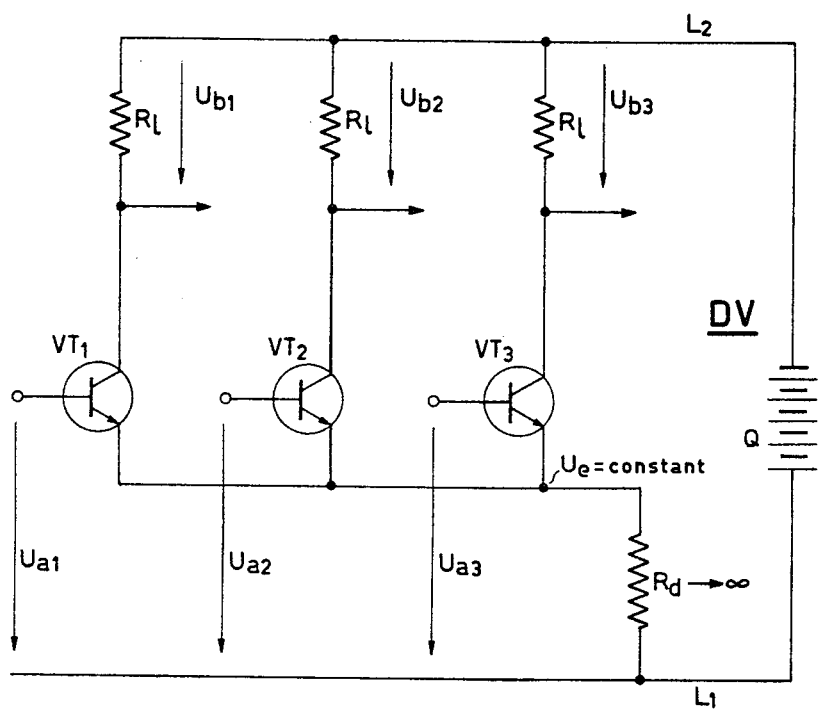
FIG. 6 is a circuit diagram of a second embodiment of a differentiating arrangement DV which may be utilized in the embodiment of FIG. 3.

FIG. 6 is a circuit diagram of a second embodiment of a differentiating arrangement which may be utilized in the embodiment of FIG. 3. In FIG. 6, three transistors VT1, VT2 and VT3, each having emitter, collector and base electrodes, are each connected as amplifiers. The emitter electrodes of the transistors VT1, VT2 and VT3 are connected through a common differential resistor $Rd$ having a very high resistance value $Rd=\Delta U/\Delta I$ to a lead L1. The lead L1 is connected to one polarity terminal of a DC source Q in a manner whereby the common emitter potential $Ue$ causes the sum of the emitter currents to remain constant. Each of the input voltages $Ua1$, $Ua2$ and $Ua3$, produced by the photocells 41, 42 and 43, is applied between the base electrode of the corresponding transistor and the supply lead L1.

The collector electrodes of the three transistors VT1, VT2 and VT3 are connected via corresponding load resistors RL having the same resistance values to a lead L2 which is connected to the other polarity terminal of the DC source Q. The output voltages $Ub1$, $Ub2$ and $Ub3$ appear across the load resistors RL. The sum of the output voltages $Ub1$, $Ub2$ and $Ub3$ remains constant during equal current amplification by the transistors VT1, VT2 and VT3.

Figure 7:
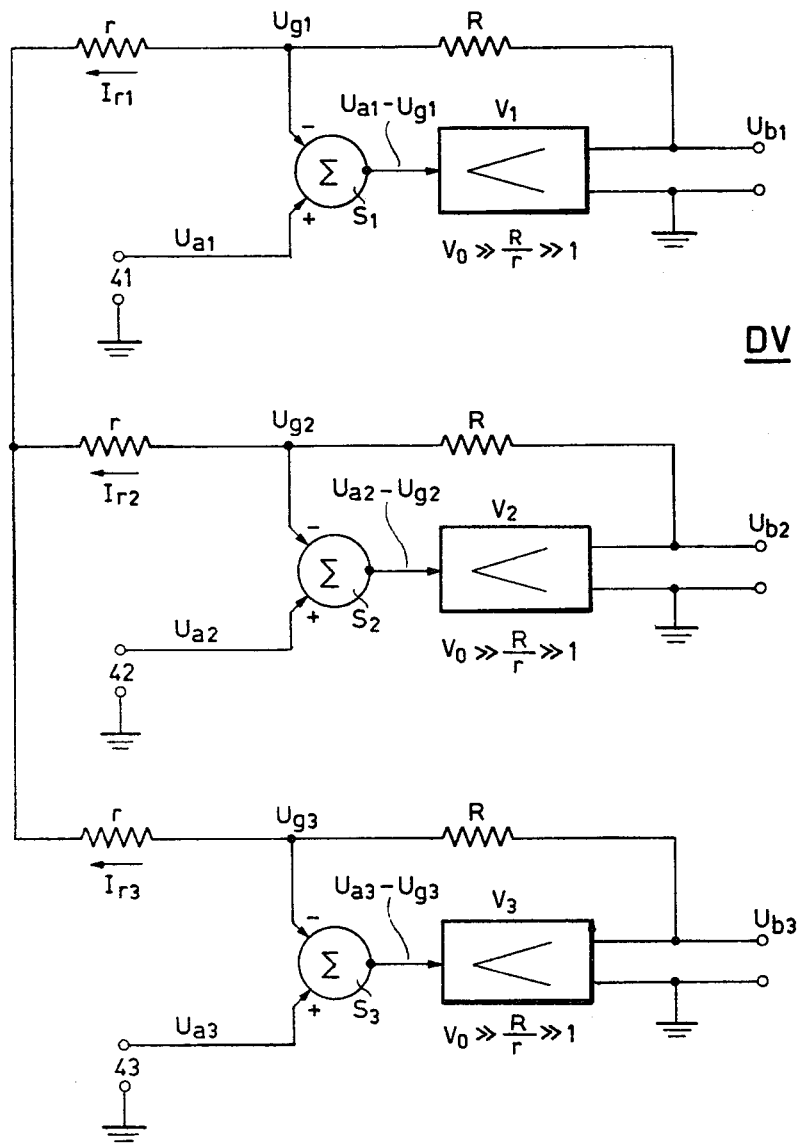
FIG. 7 is a circuit diagram of a third embodiment of a differentiating arrangement DV which may be utilized in the embodiment of FIG. 3.

FIG. 7 is a circuit diagram of a third embodiment of a differentiating arrangement which may be utilized in the embodiment of FIG. 3. In FIG. 7, three identical DC amplifier stages V1, V2 and V3 each have an amplification factor $Vo$. The requirements of the differentiating arrangement are satisfied by the circuit of FIG. 7 which strongly affects the common components of the input voltages $Ua1$, $Ua2$ and $Ua3$ and which affects the differential components of said input voltages to a considerably lesser extent. This is accomplished by the utilization of a feedback circuit. The amplification factor $Vo$ of each of the amplifier stages V1, V2 and V3 without feedback should be considerably larger than the ratio $R/r$ of the resistance values of the resistors R and r and said ratio should in turn be considerably larger than 1. That is, $Vo \gg R/r \gg 1$.

The output voltages $Ub1$, $Ub2$ and $Ub3$ of the amplifiers V1, V2 and V3 appear at one end of the resistor R of the corresponding circuit branch. The resistor R and the resistor r of each circuit branch comprise a voltage divider; the resistance value of the resistor R being high compared to that of the resistor r and the resistance value of the resistor r being low compared to that of the resistor R. The resistors r of the three circuit branches are connected to a common junction point, so that $$I1+I2+I3=0$$

The voltages $Ug1$, $Ug2$ and $Ug3$ at the intermediate tap points of the voltage dividers $Rr$ of the corresponding circuit branches are subtracted as feedback voltages from the corresponding input voltages $Ua1$, $Ua2$ and $Ua3$ in summing devices S1, S2 and S3. Thus, a voltage $Ua1-Ug1$ is applied to the input of the amplifier V1, a voltage $Ua2-Ug2$ is applied to the input of the amplifier V2, and a voltage $Ua3-Ug3$ is applied to the input of the amplifier V3. The resulting amplification factor for the differential components of the input voltages $Ua1$, $Ua2$ and $Ua3$ is $R/r$, due to the relatively high resistance inputs. The amplification factor for the common components of the input voltages $Ua1$, $Ua2$ and $Ua3$ is 1. The output voltages $Ub1$, $Ub2$ and $Ub3$ thus satisfy the determined requirements. The circuit of FIG. 7 effectively compensates for any drifting which may occur therein.

Figure 8:
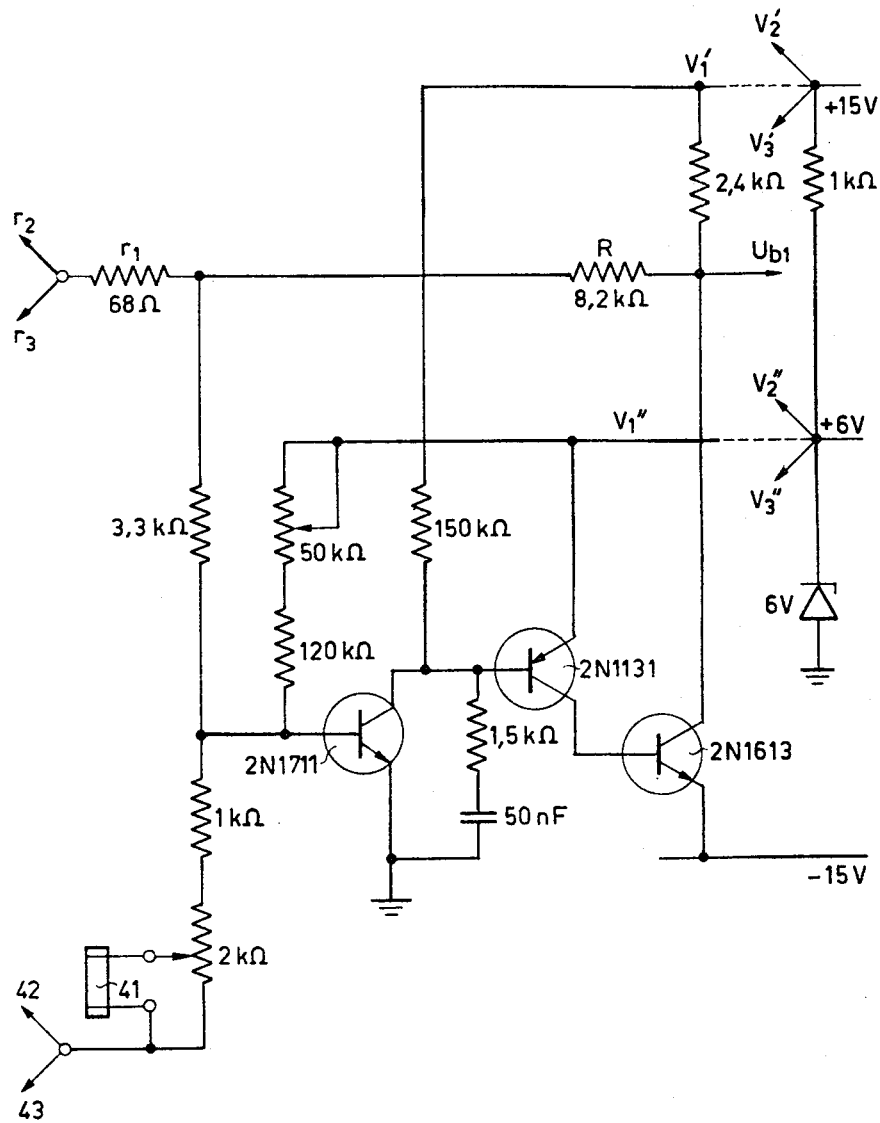
FIG. 8 is a circuit diagram of an amplifier stage V which may be utilized in the embodiment of FIG. 7.

FIG. 8 is a circuit diagram of an embodiment of the amplifier stage V which may be utilized in the embodiment of FIG. 7. The embodiment of FIG. 8 is labelled for the amplifier stage V1, although the same circuit may be utilized for the amplifier stage V2 or for the amplifier stage V3. The arrow headed leads $r2$, $r3$, $42$, $43$, V2', V3', and V2", V3" indicate the connections with the other circuit branches of FIG. 7. A 15 volt DC supply source and a 6 volt DC supply source are indicated by appropriate terminals.

Although FIG. 8 illustrates a specific type of transistor amplifier stage, utilizing three transistors, any suitable type of amplifier stage may be utilized for each of the amplifier stages V1, V2 and V3 of FIG. 7.

Each of the circuits of FIGS. 5, 6 and 7 thus indicates a differentiating arrangement DV which may be utilized in stage N of the circuit arrangement of FIG. 3 to convert the signals $Ua1$, $Ua2$ and $Ua3$ produced by the photocells 41, 42 and 43 into output voltage signals $Ub1$, $Ub2$ and $Ub3$ with suppressed common components and uniform transfer of the differential components.

All the linear combinations of the differentiating arrangement DV of FIG. 3 have the same characteristics as the three output signals $Ub1$, $Ub2$ and $Ub3$. That is, the zero points of the curves $Ub1$, $Ub2$ and $Ub3$ are independent of common adding and multiplying disturbances of the three input signals $Ua1$, $Ua2$ and $Ua3$. The zero points of the curves $Ub1$, $Ub2$ and $Ub3$ are especially independent of any brightness fluctuations which may be evident in the light sources and which may result from variations in lamp brightness or from improper line separations in the grating or from improper obstructions between line separations in the grating of either the indicating member 1 or the readout member 2 or both.

The following is an explanation for the selection of the coefficients of the linear combinations of the differentiating arrangement DV simplified by considering the fundamental frequency of the output signals $Ub1$, $Ub2$ and $Ub3$. Needless to say, variation of such coefficients of the linear combinations enables the zero points of the linear combinations to be positioned as desired, even in the case of more common curve shapes.

Figure 4:
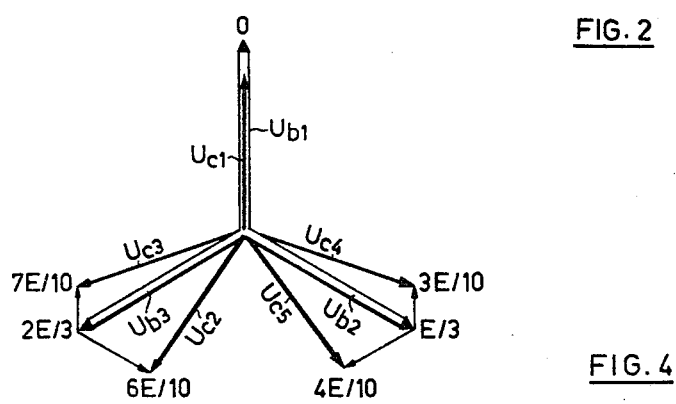
FIG. 4 is a vector diagram illustrating the development of linear combinations from the output signals of the differentiating arrangement of the embodiment of FIG. 3.

In FIG. 4, the output signals $Ub1$, $Ub2$ and $Ub3$ are represented as vectors which are phase shifted 120 degrees relative to each other or phase shifted 0, $E/3$ and $2E/3$ relative to the unit scale separation or interval E of the line standard of the indicating member 1. FIG. 4 illustrates how $p$ linear combinations $Uc1$ to $Uc5$ of the output signals $Ub1$, $Ub2$ and $Ub3$ of the differentiating arrangement DV of FIG. 3 may be produced by adding pairs of partial values $(p1)(Ub1)$, $(p2)(Ub2)$ and $(p3)(Ub3)$ of the vectors $Ub1$, $Ub2$ and $Ub3$ to said vectors at appropriately selected coefficients. The zero points of the linear combinations $Uc1$, $Uc2$, $Uc3$, $Uc4$ and $Uc5$ with regard to the zero points of the voltage signal $Ub1$ have determined phase displacements of, for example, $0, 6E/10, 7E/10, 3E/10, 4E/10$, as indicated in FIG. 4.

Stage 0 of FIG. 3 indicates combining means, namely resistor circuitry and resistance magnitudes for producing the linear combinations $Uc1$, $Uc2$, $Uc3$, $Uc4$ and $Uc5$ of the output signals $Ub1$, $Ub2$ and $Ub3$ with determined phase displacements. The resistor circuitry corresponds to the known Scott circuitry.

The linear combination signals $Uc1$ to $Uc5$ are fed to multivibrators, flip-flops or triggers ST1 to ST5; the signal $Uc1$ being fed to the multivibrator ST1, the signal $Uc2$ being fed to the multivibrator ST2, the signal $Uc3$ being fed to the multivibrator ST3, the signal $Uc4$ being fed to the multivibrator ST4 and the signal $Uc5$ being fed to the multivibrator ST5. Each of the multivibrators ST1 to ST5 is the same as the others and preferably comprises a Schmitt trigger. Each of the triggers ST1 to ST5 produces a DC output signal having one of two possible magnitudes. The magnitude of the DC output signal of each of the triggers ST1 to ST5 changes each time that the polarity of the signal $Uc1$ to $Uc5$ or $ic1$ to $ic5$ fed to said triggers changes, at the zero points of said $Uc$ or $ic$ signals. Any suitable multivibrator or trigger may be utilized as the triggers ST1 to ST5 such as, for example, those described in "Taschenbuch der Nachrichtenverarbeitung" or Pocket Book of Communication Processing, by K. Steinbuch, Springer, 1962. Each trigger ST1 to ST5 may comprise a bistable multivibrator or flip-flop.

Thus, in FIG. 3, five binary DC signals or pulses G, H, J, K and L are provided at the outputs of the triggers ST1, ST2, ST3, ST4 and ST5, respectively. The output impedances of the differentiating arrangement DV and the input impedances of the triggers ST1 to ST5 are negligible compared with the resistance values of the Scott circuitry of stage 0 of FIG. 3. The condition combinations of the five binary signals G, H, J, K and L vary, in terms of a unit scale separation or interval E of the line standard of the indicating member 1, in accordance with Table I, for each relative displacement of the indicating member 1 and the readout member 2.

TABLE I

|  | G | H | J | K | L |
|---|---|---|---|---|---|
| N·E+0·E/10 | 1 | 0 | 0 | 0 | 0 |
| N·E+1·E/10 | 1 | 1 | 0 | 0 | 0 |
| N·E+2·E/10 | 1 | 1 | 1 | 0 | 0 |
| N·E+3·E/10 | 1 | 1 | 1 | 1 | 0 |
| N·E+4·E/10 | 1 | 1 | 1 | 1 | 1 |
| N·E+5·E/10 | 0 | 1 | 1 | 1 | 1 |
| N·E+6·E/10 | 0 | 0 | 1 | 1 | 1 |
| N·E+7·E/10 | 0 | 0 | 0 | 1 | 1 |
| N·E+8·E/10 | 0 | 0 | 0 | 0 | 1 |
| N·E+9·E/10 | 0 | 0 | 0 | 0 | 0 | where N is a whole number.

Each specific duration or value of the binary signals or pulses is determined by a specific combination of the five binary signals at the output of stage P of FIG. 3. If the relative displacement of the indicating and readout members 1 and 2, as indicated by the photocells of stage M, is in an opposite or negative direction, then the transition from one combination to the other is also in a negative sense; that is, upward instead of downward.

Figure 9:
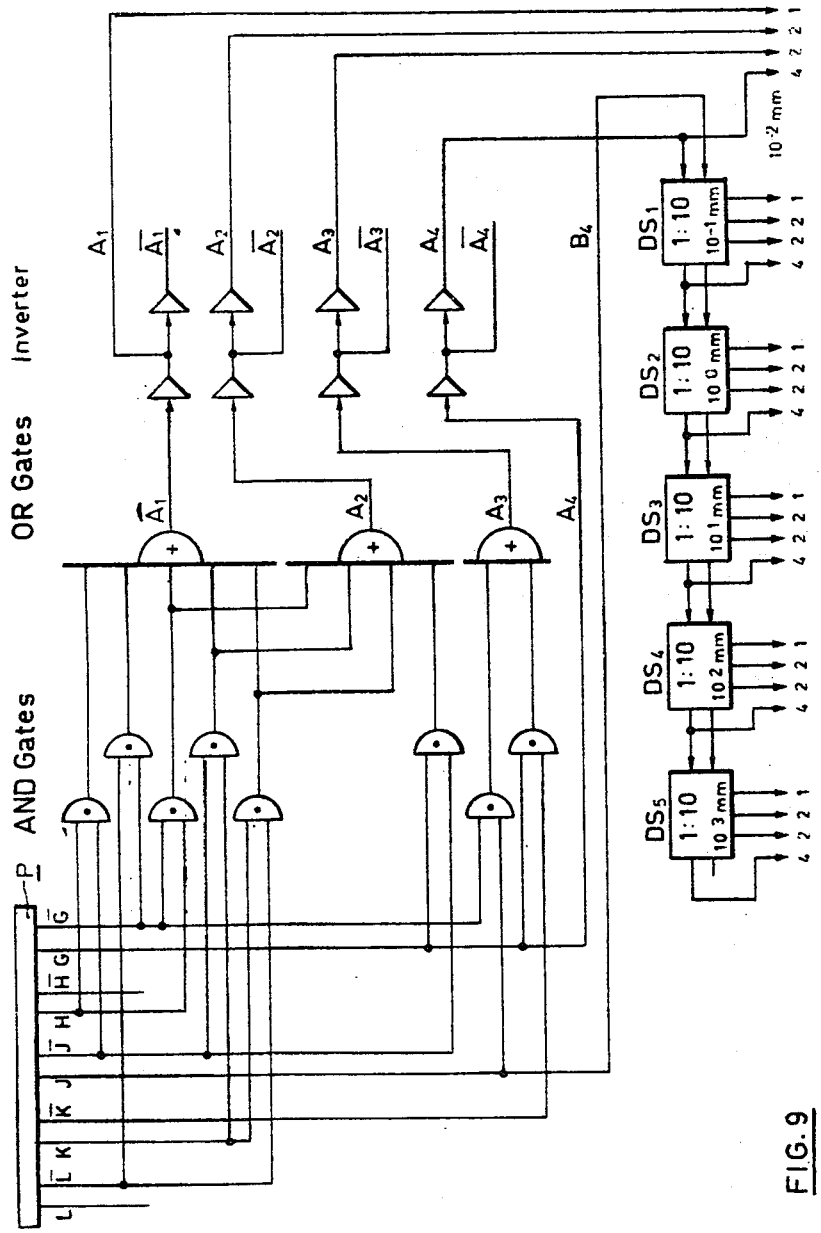
FIG. 9 is a circuit diagram of an embodiment of a code converter which may be utilized in the embodiment of FIG. 3 at the output of stage P.

The five place binary code system indicated in Table I may be readily converted to a binary coded decimal representation by the utilization of a relatively simple logic circuit such as, for example, that of FIG. 9. The circuit of FIG. 9 thus functions as a code converter. The CZ code, disclosed in my copending patent application Ser. No. 392,998, may be utilized. The CZ code is a magnitude or value code utilizing the magnitudes or values 4, 2, 2, 1 as indicated in Table II.

TABLE II

| | Binary Places | | | |
|---|---|---|---|---|
| | A4 | A3 | A2 | A1 |
| | Value | | | |
| Decimal Number | 4 | 2 | 2 | 1 |
| 0 | 0 | 0 | 0 | 0 |
| 1 | 0 | 0 | 0 | 1 |
| 2 | 0 | 0 | 1 | 0 |
| 3 | 0 | 1 | 0 | 1 |
| 4 | 0 | 1 | 1 | 0 |
| 5 | 1 | 0 | 0 | 1 |
| 6 | 1 | 0 | 1 | 0 |
| 7 | 1 | 1 | 0 | 1 |
| 8 | 1 | 1 | 1 | 0 |
| 9 | 1 | 1 | 1 | 1 |

The two code tables, Table I and Table II, when combined, result in the following equations or relationships for the conversion of the five place binary signals G, H, J, K and L to the CZ code. Expressed in Boolean algebra, the four binary places A1, A2, A3 and A4 are defined as follows.

$$A1 = H\bar{J} + \bar{L}G + \bar{G}H + JK + K\bar{L}$$
$$A2 = \bar{G}H + \bar{J}K + K\bar{L} + G\bar{J}$$
$$A3 = \bar{G}J + G\bar{K}$$
$$A4 = G$$

For the decimal conversion of the unit scale separations or intervals of the line standard of the indicating member 1 in according with the disturbance-insensitive two place pulse counting system of the aforementioned copending patent application, an additional signal B4, which equals J, is provided in addition to the binary signal A4, which equals G. The signal B4 is phase displaced by ¼ of a cycle or period relative to the signal A4. Thus, a two place binary code comprising the signals A4 and B4 is provided for the input of a storage arrangement comprising five decimal converting or counter stages DS1, DS2, DS3, DS4 and DS5 of the type disclosed in the aforementioned copending patent application.

Thus, in the converter circuit arrangement of FIG. 9, measurement variations of a whole unit scale separation or interval may be stored in the decimal converting and storage stages DS1 to DS5 and are indicated in positive or negative directions. The stages DS1 to DS5 may be adjusted to a determined storage content. Furthermore, the measuring variations may be indicated by decimals or tenths of a unit scale separation or interval E, for example, in such a manner that the conditions of the binary code signals A1, A2, A3 and A4 are indicated by individual glow lamps or control a decade counter tube via suitable additional logic circuitry. A decade counter tube may also be controlled directly by the five place binary system signals G, H, J, K and L via suitable logic circuitry.

The binary code signals A1, A2, A3 and A4, corresponding in decimal representations to the signals of the conversion and storage stages, may be supplied to other computers or evaluating arrangements. However, if it is desired to preadjustably count the tenths of the unit scale separations or intervals by decade counter stages of the same type as the counter stages DS1 to DS5 of the storage arrangement of FIG. 9 for whole unit scale separations or intervals, then the number of linear combinations of the signals Ub1, Ub2 and Ub3 produced in stage 0 of FIG. 3 and the number of places of the resulting binary system, would have to be quadrupled.

In principle, it is possible to derive from a 4n place binary system a two place binary system which indicates measurement variations in fractions E/8n in positive and negative directions and which is suitable for processing via additional circuitry in accordance with the aforementioned copending patent application. E, of course, is the unit scale separation or interval of the line standard or grating of the indicating member 1 and n is a whole number. The derivation of the two place system from the 4n place system may be accomplished with simple logic circuitry. If a two place binary system is to be logically derived from an eight place binary system, for example, the derivation may be in accordance with Table III.

TABLE III

| P Place Binary Signal System | | | | | | | | Two Place Binary System Provided at Output | |
|---|---|---|---|---|---|---|---|---|---|
| P8 | P7 | P6 | P5 | P4 | P3 | P2 | P1 | A | B |
| 0 | 0 | 0 | 0 | 0 | 0 | 0 | 0 | 0 | 0 |
| 1 | 0 | 0 | 0 | 0 | 0 | 0 | 0 | 0 | 1 |
| 1 | 1 | 0 | 0 | 0 | 0 | 0 | 0 | 1 | 1 |
| 1 | 1 | 1 | 0 | 0 | 0 | 0 | 0 | 1 | 0 |
| 1 | 1 | 1 | 1 | 0 | 0 | 0 | 0 | 0 | 0 |
| 1 | 1 | 1 | 1 | 1 | 0 | 0 | 0 | 0 | 1 |
| 1 | 1 | 1 | 1 | 1 | 1 | 0 | 0 | 1 | 1 |
| 1 | 1 | 1 | 1 | 1 | 1 | 1 | 0 | 1 | 0 |
| 1 | 1 | 1 | 1 | 1 | 1 | 1 | 1 | 0 | 0 |
| 0 | 1 | 1 | 1 | 1 | 1 | 1 | 1 | 0 | 1 |
| 0 | 0 | 1 | 1 | 1 | 1 | 1 | 1 | 1 | 1 |
| 0 | 0 | 0 | 1 | 1 | 1 | 1 | 1 | 1 | 0 |
| 0 | 0 | 0 | 0 | 1 | 1 | 1 | 1 | 0 | 0 |
| 0 | 0 | 0 | 0 | 0 | 1 | 1 | 1 | 0 | 1 |
| 0 | 0 | 0 | 0 | 0 | 0 | 1 | 1 | 1 | 1 |
| 0 | 0 | 0 | 0 | 0 | 0 | 0 | 1 | 1 | 0 |
| 0 | 0 | 0 | 0 | 0 | 0 | 0 | 0 | 0 | 0 | wherein $$A = \bar{P}5P7 + P5\bar{P}7 + \bar{P}1P3 + P1\bar{P}3$$
$$B = \bar{P}6P8 + P6\bar{P}8 + \bar{P}2P4 + P2\bar{P}4$$

When the two place binary system of Table III is fed to two counter stages in accordance with the aforementioned copending patent application, 16 fractions of the unit scale separation may be individually indicated for each unit interval of measurement and four intervals of ¼ cycle or period duration each may be determined by a preadjustable counter stage indicator.

FIGS. 10 and 11 illustrate an embodiment of the angle measuring arrangement of the present invention. In FIGS. 10 and 11, a shaft 61 is guided by a radial bearing 62 and an axial bearing 63 of an angle indicating disc 64. The area or areas of the periphery of the disc 64 is formed in an optical line standard, gradient, grating, indicating or graduated scale 65 (FIG. 11) similar to those described with reference to FIGS. 1 and 3, except that the lines extend radially instead of parallel to each other. The unit scale separation or interval may be, for example, $\frac{1}{100}$ millimeter, or about 20 arc seconds at a disc radius of 21 centimeters.

Stationary positioned electro-optical readout units 66 and 66' are arranged at diametrically opposed areas of the disc 64. Each of the readout units 66 and 66' may comprise, for example, a source of light 67 or 67', a converging lens or lens system 68 or 68' and a graduated scale 69 or 69' similar to that of the readout member 2 of FIG. 3. A plurality of photocells 70, 71, 72 and 73 and 70', 71', 72' and 73' are supported by the readout units 66 and 66' on the opposite side of the disc 64 from the light sources 67 and 67'.

At each movement of the disc 64 about its axis, each of the photocells 70, 71, 72 and 73 and 70', 71', 72', and 73' produces an output signal, current or voltage comprising an AC superimposed upon a DC similar to the signals shown in FIG. 2. The output signals produced by the photocells are phase shifted 90 degrees relative to each other. The aforementioned Swiss patent application No. 14,895/63 discloses an arrangement for providing a two place binary system at both readout areas by connecting an interpolator 74 to the outputs of the photocells 70, 71, 72 and 73 and by connecting an interpolator 74' to the outputs of the photocells 70', 71', 72' and 73'.

Each of the interpolators 74 and 74' provides two outputs and the outputs of both interpolators together provide a two place binary system having displacement indicating signals which are cyclic or periodic in fractions of the unit scale separations or intervals of the indicating disc grating or line standard. The positive or negative direction of movement of the indicating disc 64 about its axis is indicated by the positive or negative direction of the phase shift between the binary signals at the outputs of the interpolators 74 and 74'. Each cycle or period of the signals provided by the interpolators 74 and 74' indicates a variation in the angular position of the indicating disc 64 of one unit scale separation or interval such as, for example, 20 arc seconds.

The cycles or periods of the binary signals thus represent positive and negative angular displacements or movements. The binary signals indicating angular displacement may thus be counted, accounting for their positive or negative directions, by a counter. The angular displacement indicating electrical binary signals of both interpolators 74 and 74' may be added to produce a resultant sum which indicates the angular position of the angular displacement indicating disc in relation to its initial position.

A suitable adder circuit 75, which may comprise that disclosed in the aforementioned Swiss patent application Ser. No. 10,417/63 or in the aforementioned copending patent application Ser. No. 392,998, may be utilized to add the angular displacement indicating binary signals of the interpolators 74 and 74' to provide two inputs to a counter 76. The counter 76 may comprise any suitable counter which counts in a forward and a backward direction. At any time, the counter 76 indicates the angular position of the angular displacement indicating disc 64 relative to its initial position.

The measurement of the angular displacement at two areas of indicating disc provides twice the actual displacement information. Thus, every count of the counter 76 actually represents half of a displacement rather than a whole displacement as indicated at the outputs of the interpolators 74 and 74'. A preferred counter to be utilized as the counter 76 is that disclosed in the aforementioned copending patent application Ser. No. 392,998.

The angular displacement measuring arrangement of the present invention indicates angular variations of the indicating disc 64 in magnitudes of an arc second with great accuracy, even at angular velocities of said disc of greater than 100 degrees per second.

The displacement measuring arrangement of FIG. 3 may be utilized to measure the angular displacement of the indicating disc 64 of FIG. 10. In such case, the disc 64 would be utilized as the indicating member 1 and the grating lines of the indicating and readout members would extend radially rather than parallel to each other. The embodiment of FIG. 3 would be utilized at each of the two measuring areas of the indicating disc 64 and would comprise each interpolator 74 and 74'.

While the invention has been described by means of specific examples and in specific embodiments, I do not wish to be limited thereto, for obvious modifications will occur to those skilled in the art without departing from the spirit and scope of the invention.

What I claim is:

1. A displacement measuring arrangement comprising, in combination, an indicating member and a readout member superimposed upon said indicating member, said indicating member and said readout member each having optical lined grating means superimposed upon and in determined position relative to that of the other, adjacent lines of the grating means of said indicating member being spaced from each other by a unit scale separation and adjacent lines of the grating means of said readout member being spaced from each other by a separation equal to a determined fraction of the unit scale separation of the grating means of said indicating member;

electro-optical means including a plurality of photocells for producing a plurality of electrical signals $Ua1$, $Ua2$, $Ua3$ having characteristics indicating the brightness of light irradiating both said grating means thereby indicating relative displacement of said grating means and of said indicating and readout members and the direction of the relative displacement, said electrical signals including common components and differential components;

differentiating means for suppressing the common components and for providing the differential components $Ub1$, $Ub2$, $Ub3$ of said plurality of electrical signals $Ua1$, $Ua2$, $Ua3$ as defined by equations $$Ub1 = v\left[Ua1 - \left(\frac{Ua2}{2}\right)\left(\frac{Ua3}{2}\right)\right]$$

$$Ub2 = v\left[Ua2 - \left(\frac{Ua3}{2}\right)\left(\frac{Ua1}{2}\right)\right]$$

$$Ub3 = v\left[Ua3 - \left(\frac{Ua1}{2}\right)\left(\frac{Ua2}{2}\right)\right]$$

wherein $v$ is a common transition factor, said differentiating means having a plurality of inputs and a plurality of outputs; and connecting means for supplying said plurality of electrical signals from said plurality of photocells to the plurality of inputs of said differentiating means and for deriving the differential components of said plurality of electrical signals from the plurality of outputs of said differentiating means.

2. A displacement measuring arrangement comprising, in combination, an indicating member and a readout member superimposed upon said indicating member, said indicating member and said readout member each having optical lined grating means superimposed upon and in determined position relative to that of the other, adjacent lines of the grating means of said indicating member being spaced from each other by a unit scale separation and adjacent lines of the grating means of said readout member being spaced from each other by a separation equal to a determined fraction of the unit scale separation of the grating means of said indicating member;

electro-optical means including a plurality of photocells for producing a plurality of electrical signals $Ua1$, $Ua2$, $Ua3$ having characteristics indicating the brightness of light irradiating both said grating means thereby indicating relative displacement of said grating means and of said indicating and readout members and the direction of the relative displacement, said electrical signals including common components and differential components;

differentiating means for suppressing the common components and for providing the differential components $Ub1$, $Ub2$, $Ub3$ of said plurality of electrical signals $Ua1$, $Ua2$, $Ua3$ as defined by equations $$Ub1 = v\left[Ua1 - \left(\frac{Ua2}{2}\right)\left(\frac{Ua3}{2}\right)\right]$$

$$Ub2 = v\left[Ua2 - \left(\frac{Ua3}{2}\right)\left(\frac{Ua1}{2}\right)\right]$$

$$Ub3 = v\left[Ua3 - \left(\frac{Ua1}{2}\right)\left(\frac{Ua2}{2}\right)\right]$$

wherein $v$ is a common transition factor, said differentiating means comprising a circuit arrangement having a plurality of circuit branches connected to a common junction point for maintaining the sum of the currents in its branches equal to zero and thereby maintaining the equation $Ub1 + Ub2 + Ub3 = 0$, a plurality of input means for applying each of the signals $Ua1$, $Ua2$, $Ua3$ to corresponding ones of said circuit branches, and a plurality of output means for deriving each of the components $Ub1$, $Ub2$, $Ub3$ from corresponding ones of said circuit branches; and connecting means for supplying said plurality of electrical signals from said plurality of photocells to the plurality of inputs of said differentiating means and for deriving the differential components of said plurality of electrical signals from the plurality of outputs of said differentiating means.

3. A displacement measuring arrangement comprising, in combination, an indicating member and a readout member superimposed upon said indicating member, said indicating member and said readout member each having optical lined grating means superimposed upon and in determined position relative to that of the other, adjacent lines of the grating means of said indicating member being spaced from each other by a unit scale separation and adjacent lines of the grating means of said readout member being spaced from each other by a separation equal to a determined fraction of the unit scale separation of the grating means of said indicating member;

electro-optical means including a plurality of photocells for producing a plurality of electrical signals $Ua1$, $Ua2$, $Ua3$ having characteristics indicating the brightness of light irradiating both said grating means thereby indicating relative displacement of said grating means and of said indicating and readout members and the direction of the relative displacement, said electrical signals including common components and differential components;

differentiating means for suppressing the common components and for providing the differential components $Ub1$, $Ub2$, $Ub3$ of said plurality of electrical signals $Ua1$, $Ua2$, $Ua3$ as defined by equations $$Ub1 = v\left[Ua1 - \left(\frac{Ua2}{2}\right)\left(\frac{Ua3}{2}\right)\right]$$

$$Ub2 = v\left[Ua2 - \left(\frac{Ua3}{2}\right)\left(\frac{Ua1}{2}\right)\right]$$

$$Ub3 = v\left[Ua3 - \left(\frac{Ua1}{2}\right)\left(\frac{Ua2}{2}\right)\right]$$

wherein $v$ is a common transition factor, said differentiating means comprising a circuit arrangement having a plurality fo circuit branches each including a transistor having a plurality of electrodes, said circuit arrangement including a power source having two opposite polarity terminals, a differential resistor having a very high resistance value connected between one terminal of said power source and corresponding ones of the electrodes of each of said transistors, a load resistor connected in series between a corresponding second one of the electrodes of each of said transistors and the other terminal of said power source, a plurality of input means for applying each of the signals $Ua1$, $Ua2$, $Ua3$ to corresponding third ones of the electrodes of each of said transistors, and a plurality of output means for deriving each of the components $Ub1$, $Ub2$, $Ub3$ from correspnoding ones of said load resistors; and connecting means for supplying said plurality of electrical signals from said plurality of photocells to the plurality of inputs of said differentiating means and for deriving the differential components of said plurality of electrical signals from the plurality of outputs of said differentiating means.

4. A displacement measuring arrangement comprising, in combination, an indicating member and a readout member superimposed upon said indicating member, said indicating member and said readout member each having optical lined grating means superimposed upon and in determined position relative to that of the other, adjacent lines of the grating means of said indicating member being spaced from each other by a unit scale separation and adjacent lines of the grating means of said readout member being spaced from each other by a separation equal to a determined fraction of the unit scale separation of the grating means of said indicating member;

electro-optical means including a plurality of photocells for producing a plurality of electrical signals $Ua1$, $Ua2$, $Ua3$ having characteristics indicating the brightness of light irradiating both said grating means thereby indicating relative displacement of said grating means and of said indicating and readout members and the direction of the relative displacement, said electrical signals including common components and differential components;

differentiating means for suppressing the common components and for providing the differential components $Ub1$, $Ub2$, $Ub3$ of said plurality of electrical signals $Ua1$, $Ua2$, $Ua3$ as defined by equations $$Ub1 = v\left[Ua1 - \left(\frac{Ua2}{2}\right)\left(\frac{Ua3}{2}\right)\right]$$

$$Ub2 = v\left[Ua2 - \left(\frac{Ua3}{2}\right)\left(\frac{Ua1}{2}\right)\right]$$

$$Ub3 = v\left[Ua3 = \left(\frac{Ua1}{2}\right)\left(\frac{Ua2}{2}\right)\right]$$

wherein $v$ is a common transition factor, said differentiating means comprising a circuit arrangement having a plurality of circuit branches connected to a common junction point, each of said circuit branches comprising amplifier means having feedback means for suppressing the common components of input signals and feedback means for affecting the differential components of input signals to a relatively negligible extent and maintaining the equation $Ub1 + Ub2 + Ub3 = 0$, a plurality of input means for applying each of the signals $Ua1$, $Ua2$, $Ua3$ to corresponding ones of said amplifier means, and a plurality of output means for deriving each of the components $Ub1$, $Ub2$, $Ub3$ from corresponding ones of said amplifier means; and connecting means for supplying said plurality of electrical signals from said plurality of photocells to the plurality of inputs of said differentiating means and for deriving the differential components of said plurality of electrical signals from the plurality of outputs of said differentiating means.

5. A displacement measuring arrangement as claimed in claim 4, further comprising a plurality of first resistors and a plurality of feedback resistors, and wherein each of said circuit branches is connected to said common junction point through a corresponding one of said plurality of first resistors, each of said common component suppressing feedback means comprising a corresponding one of said plurality of feedback resistors, corresponding ones of said first and feedback resistors being connected in series with each other and forming a plurality of voltage dividers, and means connecting the common point between the resistors of each of said voltage dividers to a corresponding one of said amplifier means.

6. A displacement measuring arrangement as claimed in claim 5, wherein each of said amplifier means has an amplification factor which is considerably greater than the ratio of the resistance value of the corresponding feedback resistor to the resistance value of the corresponding first resistor which ratio is considerably greater than one.

7. A displacement measuring arrangement comprising, in combination,
- an angle indicating disc member and a pair of diametrically opposed readout members superimposed upon said indicating disc, said indicating disc having a pair of diametrically opposed optical lined grating means, each of said optical lined grating means having a plurality of spaced radially extending lines, each of said pair of readout members having optical lined grating means superimposed upon and in determined position relative to the corresponding grating means of said indicating disc, the grating means of each of said readout members having a plurality of radially extending lines, adjacent lines of each of the grating means of said indicating disc being spaced from each other by a unit scale separation and adjacent lines of the grating means of each of the corresponding ones of said readout members being spaced from each other by a separation equal to a determined fraction of the unit scale separation of the grating means of said indicating disc;
- electro-optical means including a plurality of photocells for producing a plurality of electrical signals for each pair of the pair of corresponding gratings of said indicating disc and said readout members having characteristics indicating the brightness of light irradiating each of both pairs of grating means thereby twice indicating relative displacement of said corresponding grating means and of said indicating disc and readout members and the direction of the relative displacement;
- adding means for adding said electrical signals, said adding means having a plurality of inputs and a pair of outputs;
- means connected between said electro-optical means and the inputs of said adding means for supplying said electrical signals to said adding means; and
- counter means adapted to count in a forward direction and in a backward direction connected to the outputs of said adding means.

8. A displacement measuring arrangement comprising, in combination,
- an angle indicating disc member and a pair of diametrically opposed readout members superimposed upon said indicating disc, said indicating disc having a pair of diametrically opposed optical lined grating means, each of said optical lined grating means having a plurality of spaced radially extending lines, each of said pair of readout members having optical lined grating means superimposed upon and in determined position relative to the corresponding grating means of said indicating disc, the grating means of each of said readout members having a plurality of radially extending lines, adjacent lines of each of the grating means of said indicating disc being spaced from each other by a unit scale separation and adjacent lines of the grating means of each of the corresponding ones of said readout members being spaced from each other by a separation equal to a determined fraction of the unit scale separation of the grating means of said indicating disc;
- electro-optical means including a plurality of photocells for producing a plurality of electrical signals for each pair of the pair of corresponding gratings of said indicating disc and said readout members having characteristics indicating the brightness of light irradiating each of both pairs of grating means thereby twice indicating relative displacement of said corresponding grating means and of said indicating disc and readout members and the direction of the relative displacement, said electrical signals including common components and differential components;
- differentiating means for suppressing the common components and for providing the differential components of said plurality of electrical signals, said differentiating means having a plurality of inputs and a plurality of outputs;
- connecting means for supplying said plurality of electrical signals from said plurality of photocells to the plurality of inputs of said differentiating means and for deriving the differential components of said plurality of electrical signals from the plurality of outputs of said differentiating means;
- adder means for adding said differential components of said plurality of electrical signals, said adder means having a plurality of inputs and a pair of outputs;
- means connected between the outputs of said differentiating means and the inputs of said adder means for supplying said differential components to said adder means; and
- counter means adapted to count in a forward direction and in a backward direction connected to the outputs of said adder means.

9. A displacement measuring arrangement comprising, in combination,
- an angle indicating disc member and a pair of diametrically opposed readout members superimposed upon said indicating disc, said indicating disc having a pair of diametrically opposed optical lined grating means, each of said optical lined grating means having a plurality of spaced radially extending lines, each of said pair of readout members having optical lined grating means superimposed upon and in determined position relative to the corresponding grating means of said indicating disc, the grating means of each of said readout members having a plurality of radially extending lines, adjacent lines of each of the grating means of said indicating disc being spaced from each other by a unit scale separation and adjacent lines of the grating means of each of the corresponding ones of said readout members being spaced from each other by a separation equal to a determined fraction of the unit scale separation of the grating means of said indicating disc;
- electro-optical means including a plurality of photocells for producing a plurality of electrical signals for each pair of the pair of corresponding gratings of said indicating disc and said readout members having characteristics indicating the brightness of light irradiating each of both pairs of grating means thereby twice indicating relative displacement of said corresponding grating means and of said indicating disc and readout members and the direction of the relative displacement, said electrical signals including common components and differential components;
- differentiating means for suppressing the common components and for providing the differential components of said plurality of electrical signals, said differentiating means having a plurality of inputs and a plurality of outputs;

connecting means for supplying said plurality of electrical signals from said plurality of photocells to the plurality of inputs of said differentiating means and for deriving the differential components of said plurality of electrical signals from the plurality of outputs of said differentiating means;

resistance means connected to the outputs of said differentiating means for producing a plurality of linear combinations having determined relative phase displacements from the differential components;

converter means comprising a plurality of trigger means connected to said resistance means for converting each of the linear combinations into one of a first substantially DC binary logic signal and a second substantially DC binary logic signal, each of said trigger means producing the other of said first and second binary logic signals each time the polarity of the corresponding linear combination fed to it changes its polarity;

adder means for adding said linear combinations, said adder means having a plurality of inputs and a pair of outputs;

means connected between the outputs of said trigger means of said converter means and the inputs of said adder means for supplying said linear combinations to said adder means; and counter means adapted to count in a forward direction and in a backward direction connected to the outputs of said adder means.

10. A digital evaluation system for evaluating sinusoidal signals of the same amplitude and frequency and mutually separated by equal parts of a cycle, each cycle representing a unit measurement of a measured quantity, the instantaneous value of each of said sinusoidal signals being definitely related to the instantaneous value of said measured quantity, comprising, in combination, a plurality of polarity discriminating means, one for evaluation of each of said plurality of sinusoidal signals, each adapted to generate a binary signal having two levels, and changing from one of said levels to the other for each change in polarity of the corresponding sinusoidal signal, the combinations of said binary signals simultaneously existing at the outputs of said plurality of polarity discriminating means changing in sequential unit intervals, each of said unit intervals representing a fraction of said unit measurement of said measured quantity; and logic means responsive to said combinations of binary signals, and adapted to generate measurement signals representing said fraction of said unit measurement of said measured quantity.

11. A system as set forth in claim 10, also comprising combining means for forming linear combinations of determined ones of said sinusoidal signals, in such a manner as to generate a larger plurality of combined sinusoidal signals; and wherein said polarity discriminating means comprise a plurality of polarity discriminators, one for each of said combined sinusoidal signals.

12. A system as set forth in claim 11, wherein said polarity discriminators comprise bistable multivibrators.

13. A system as set forth in claim 11, wherein said combining means comprise a plurality of Scott circuits, each consisting of two electrical resistors connected at one end to the corresponding one of said polarity discriminators, each of the other ends of said resistors being supplied with one of said combined sinusoidal signals.

14. A system as set forth in claim 13, wherein $p$ Scott circuits with one associated polarity discriminator each are provided for the generation of a $p$-phase current so that the $2p$ possible condition combinations of the $p$ binary signals obtained from the polarity discriminators each definitely characterize a predetermined fraction $nE/2p$ of a unit measurement $E$ of the measured quantity (wherein $n$ is a whole number).

15. A system as set forth in claim 14, for three sinusoidal signals, wherein there are five polarity discriminators for the five sine components of a five-phase system, for the generation of a five-phase system of binary signals for subdividing the unit measurement into tenths of a unit measurement $E$.

16. A system as set forth in claim 15, also comprising counting means for counting the unit measurements $E$ of the measured quantity, with the correct polarity.

17. A system as set forth in claim 16, also comprising additional logic means for converting said measurement signals to a pair of binary measurement signals; and reduction means for converting said pair of binary measurement signals to reduced binary measuring signals, identical to said binary measurement signals, but of reduced frequency.

References Cited

UNITED STATES PATENTS

| | | | |
|---|---|---|---|
| 2,788,519 | 4/1957 | Caldwell | 250—237 |
| 3,153,111 | 10/1964 | Barber et al. | 250—237 |
| 3,166,624 | 1/1965 | Vargady | 88—14 |
| 3,175,093 | 3/1965 | De Lang | 250—237 |
| 3,227,888 | 1/1966 | Shepherd et al. | 250—237 |
| 3,230,380 | 1/1966 | Cooke | 250—237 |

OTHER REFERENCES

Theocaris, "Moiré Fringes: A Powerful Measuring Device," Applied Mechanics Reviews, vol. 15, No. 5, May 1962 pp. 333–337 (88–14 MF).

RALPH G. NILSON, *Primary Examiner.*

M. A. LEAVITT, *Assistant Examiner.*